United States Patent [19]
Krause

[11] Patent Number: 4,881,125
[45] Date of Patent: Nov. 14, 1989

[54] PROGRESSIVE SCAN DISPLAY OF VIDEO DERIVED FROM FILM

[75] Inventor: Edward A. Krause, San Diego, Calif.

[73] Assignee: General Instrument Corporation, New York, N.Y.

[21] Appl. No.: 258,238

[22] Filed: Oct. 14, 1988

[51] Int. Cl.[4] .............................................. H04N 7/04
[52] U.S. Cl. .................................... 358/141; 358/140; 358/216
[58] Field of Search ................ 358/214, 141, 140, 216, 358/215

[56] References Cited

U.S. PATENT DOCUMENTS

| | | | |
|---|---|---|---|
| 4,509,071 | 4/1982 | Fujimura | 358/140 |
| 4,607,282 | 8/1986 | Vande Polder | 358/214 |
| 4,641,188 | 2/1987 | Dischert | 358/140 |
| 4,720,744 | 1/1988 | Washi et al. | 358/140 |

OTHER PUBLICATIONS

Tsinberg, "Phillips NTSC-Compatible Two-Channel Television System", Third International Colloquium on Advanced Television System: HDTV87, Oct. 4-8, 1987, Ottawa, Canada.

Isnardi, et al., "A single Channel, NTSC Compatible Widescreen EDTV Syst.," Third International Colloquim on Advanced Television System: HDTV87, Oct. 4-8, 1987, Ottawa, Canada.

Lucas, "B-MAC and HTDV-How Does It Fit?" Third International Colloquim on Advanced Television System: HDTV87, Oct. 4-8, Ottawa, Canada.

Primary Examiner—James J. Groody
Assistant Examiner—David E. Harvey
Attorney, Agent, or Firm—Edward W. Callan

[57] ABSTRACT

A system for providing a progressive-scan video display signal from a received video signal derived from a film having successive image frames by producing odd and even video fields from each film frame, with the video fields being produced at a greater rate than the film frame rate and in a repetitive sequentially varying relationship to the film frames. The system includes one-field delay devices for delaying each field of the received video signal; and a switching circuit and one-line FIFO stacks for combining the received and delayed video fields to provide a progressive-scan video frame signal at the video field rate, in which alternate lines are derived respectively from odd and even video fields. A film-sync detection device determines the positions of the received video fields in the repetitive sequence; and a control circuit coupled to the film-sync detection device controls the switching circuit and the one-line FIFO stacks in accordance with said determined field positions to vary the combinations of the received and delayed video fields in accordance with the repetitive sequentially varying relationship of the received video fields to the film frames from which they were derived.

2 Claims, 4 Drawing Sheets

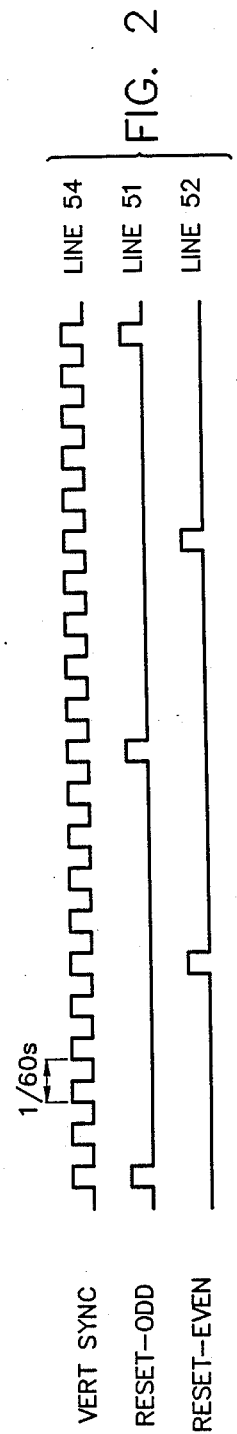
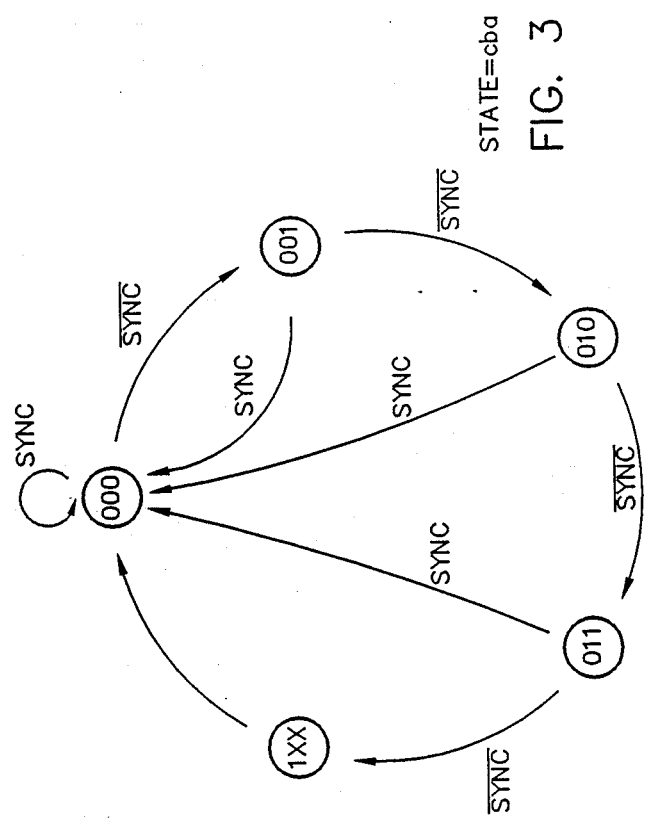

PROGRESSIVE SCAN DISPLAY OF VIDEO DERIVED FROM FILM

BACKGROUND OF THE INVENTION

The present invention generally pertains to the manner of displaying video signals and is particularly directed to the progressive scan display of video signals derived from a film having successive image frames, such as motion picture film.

In an NTSC television system, video signal displays typically are provided by interlacing video fields. Odd and even video fields are alternatively transitted at 60 fields per second, and upon receipt, the odd and even fields are displayed in an interlaced format to provide video frames at 30 frames per second.

The concept of interlaced-scanning displays was devised as a compromise between vertical resolution, temporal resolution, and transmission bandwidth. In theory, if the bandwidth is fixed, then the interlaced display is capable of achieving either twice the vertical resolution or twice the temporal resolution of the corresponding progressive-scan display. Unfortunately, there are disadvantages associated with interlaced systems. Much of the improvement is lost when both motion and high vertical frequencies occur simultaneously. Even for still pictures, the vertical resolution is limited by what is known as the Kell Factor. It has been determined that the subjective improvement in resolution for an interlaced television system having twice the scan lines of a progressive scan system does not exceed 25 to 30%. Oher penalties include interline flicker and line crawl—two disturbing defects associated with interlaced systems. Both become visible when high vertical frequencies are present.

Almost all existing algorithms for achieving progressive scan display from an interlaced transmission format do so by estimating the missing lines in each field. The simplest estimator would either repeat an adjacent line or average the two neighboring lines in the same field. Unfortunately, this reduces vertical resolution and defeats the original purpose of interlace. A better solution is to fill in the missing lines by replicating the same line or averaging the same two lines in the previous and following fields. Although this reduces temporal resolution, it achieves the correct result at the times when the viewer is most sensitive to defects—when stationary images are displayed. Unfortunately, it is more costly to implement since a frame store or field store is required.

More effective progressive scan algorithms use a combination of both vertical averaging and temporal averaging. Through the use of a simple motion detector, a decision is made to perform temporal averaging if the image or region is believed to be stationary, and vertical averaging otherwise. In this case, the result is correct when the image is stationary but a loss in vertical resolution still occurs in the presence of motion. Often used arguments claiming reduced viewer sensitivity to moving spatial details can be disputed due to the very high likelihood of visual tracking by the viewer. As a result, the sudden loss in sharpness that occurs during the transition from stationary to moving detail can be quite noticeable. Other disadvantages are the susceptibility of the motion detector to errors and the requirement of a frame store at the receiver.

The next improvement in progressive scan implementations is often accomplished through the use of an error channel. For instance, Tsinberg, "Philips NTSC-Compatible Two-Channel Television System", *Third International Colloquium on Advanced Television Systems: HDTV87*, Oct. 4–8, 1987, Ottawa, Canada describes the use of a time-compressed line-difference signal to improve the estimates obtained by vertical averaging; while Isnardi et al., "A Single Channel, NTSC Compatible Widescreen EDTV System", *Third International Colloquium on Advanced Television Systems: HDTV87*, Oct. 4–8, 1987, Ottawa, Canada, describe the use of a low-bandwidth vertical-temporal "helper" signal to improve the estimates derived by temporal averaging. Hence, these recent methods all used interpolation and then sought to eliminate the accompanying artifacts by sending additional information.

A different approach was proposed by Lucas, "B-MAC and HDTV - How Does It Fit?" *Third International Colloquium on Advanced Television Systems: HDTV87*, Oct. 4–8, 1987, Ottawa, Canada, wherein the information contained in two vertically-adjacent scan lines of a 525 line progressive scan system was multiplexed into a single scan line of a 525 line interlaced system. At the receiver, the order of information is restored and then displayed in progressive scan format. Unfortunately, if the horizontal bandwidth is fixed, only half of the original video samples can be sent. In this case, a loss in diagonal resolution occurs. Some degradation can also be expected on existing receivers.

SUMMARY OF THE INVENTION

The present invention provides a system for providing a progressive-scan video display signal from a received video signal derived from a film having successive image frames by producing odd and even video fields from each film frame, with the video fields being produced at a greater rate than the film frame rate and in a repetitive sequentially varying relationship to the film frames. The system of the present invention includes means for delaying each field of the received video signal; means for combining the received and delayed video fields to provide a progressive-scan video frame signal at the video field rate, in which alternate lines are derived respectively from odd and even video fields; means for determining the positions of the received video fields in the repetitive sequence; and means coupled to the determining means for controlling the combining means in accordance with said determined field positions to vary said combinations in accordance with the repetitive sequentially varying relationship of the received video fields to the film frames from which they were derived.

In accordance with the present invention a progressive scan display is provided from an interlaced signal without requiring an error channel for error-free reproduction. The system of the present invention can be used whenever the video signal source was derived from commercial motion picture film, which is filmed at twenty-four frames per second, in which case no change in the video field transmission format is required. It is therefore completely compatible with NTSC. The method for deriving the progressive-scan video signal is such that there is no loss in either vertical resolution or temporal resolution. In fact, both specifications are improved since (a) no penalty is incurred when both motion and high-vertical frequencies occur simultaneously, (b) the Kell Factor is increased significantly, and (c) no prefiltering is required to reduce the visibility of interline flicker and line crawl. In short, all of the disadvantages of interlace are eliminated and no further artifacts are introduced.

The conversion to progressive scan takes in account the features of the known methods of converting 24 frame-per-second film to 60 field-per-second video. A significant percentage of video material is initially imaged on film. In fact, almost all currently available high-aspect ratio source material, such as the movies shown in theaters, was initially imaged on film. The present invention is therefore well-suited for compatible extended-definition television proposals where full widescreen images are to be reconstructed at the receiver.

The transfer of imaging information from 24 frame-per-second film to 60 field-per-second video is typically performed using storage tube scanning, flying-spot scanning, or more recently, line scanning with a frame store and digital sequencing. In spite of the difference in film-scanning methods, the frame-rate conversion techniques are the same. In practice, only two conversion methods are used. One is the 3:2 pulldown method, and the other is the pulldown method with averaging.

The most common frame-rate conversion scheme for film to video transfers is the 3:2 pulldown method where the desired interpolation factor of 2.5 is achieved by alternating between three repetitions and two repetitions of each frame of film. FIG. 4 shows the derivation of interlaced video from film using this method.

The interlaced raster required for display on NTSC receivers is easily achieved by discarding the even lines in every odd field and the odd lines in every even field. In the case of 3:2 pulldown method, the information that is discarded is redundant. Since each frame of film is repeated a minimum of two times, the same lines that were discarded in an even video field are transmitted in the previous and/or the following odd fields. Therefore, exact reconstruction of the complete frame is easily accomplished at the receiver by combining two adjacent fields of transmitted video. Table 1 and FIG. 4 show which interlaced fields must be combined to create each sequential frame of video output. The sequence repeats on a ten frame basis, or equivalently, on a five frame basis with the even and odd lines interchanged.

TABLE 1

| Frame Conversion Sequence for 3:2 Pulldown | | |
|---|---|---|
| Output Frame | Odd Lines | Even Lines |
| 1 | $f_i$ or $f_{i+2}$ | $f_{i+1}$ |
| 2 | $f_{i-1}$ or $f_{i+1}$ | $f_i$ |
| 3 | $f_{i-2}$ or $f_i$ | $f_{i-1}$ |
| 4 | $f_{i+1}$ | $f_i$ |
| 5 | $f_i$ | $f_{i-1}$ |
| 6 | $f_{i+1}$ | $f_i$ or $f_{i+2}$ |
| 7 | $f_i$ | $f_{i-1}$ or $f_{i+1}$ |
| 8 | $f_{i-1}$ | $f_{i-2}$ or $f_i$ |
| 9 | $f_i$ | $f_{i+1}$ |
| 10 | $f_i$ | $f_i$ |

In some cases, the field is transmitted twice. As a result, either field may be used for display or the two may be averaged for a 3 db reduction in signal-to-noise. However, the perceived reduction would be less than 3 db since the averaging can only be performed on three of every five frames, and even then, only half of the video lines are affected.

In the alternative pulldown method with averaging, one begins with two frames of film and repeats each one twice. The fifth video field (third sequentially) is formed simply by averaging the two, either by digital processing or through the use of storage camera tubes and shutters on the film transport mechanism. The process is then repeated for the next two frames of film, thereby achieving the desired interpolation factor of 2.5. This is illustrated in FIG. 5.

As before, the resulting video sequence is converted to an interlaced raster prior to transmission. Due to the repetition of each frame during scanning however, we again note that no information is lost and reconstruction of the ideal progressive scan display is still possible. Table 2 shows which fields are used to reconstruct the respective display frames.

TABLE 2

| Frame Conversion Sequence for Pulldown with Averaging | | |
|---|---|---|
| Output Frame | Odd Lines | Even Lines |
| 1 | $f_i$ | $f_{i+1}$ |
| 2 | $f_{i-1}$ | $f_i$ |
| 3 | $f_{i-2}$ | $f_{i-1}$ |
| 4 | $f_{i+1}$ | $f_i$ |
| 5 | $f_i$ | $f_{i-1}$ |
| 6 | $f_{i+1}$ | $f_i$ |
| 7 | $f_i$ | $f_{i-1}$ |
| 8 | $f_{i-1}$ | $f_{i-2}$ |
| 9 | $f_i$ | $f_{i+1}$ |
| 10 | $f_{i-1}$ | $f_i$ |

A comparison of Table 2 with Table 1 reveals that the same reconstruction technique used for pulldown with averaging can also be used for reconstruction of 3:2 pulldown video sequences. In both cases the result is the same as film scanning using 3:2 pulldown, but without converting to an interlaced raster. Therefore the same receiver processing algorithms used for 3:2 pulldown conversion can also be used for the pulldown method with averaging. However, if the receiver is aware of the particular algorithm in use, then it is possible to perform the intermittent averaging function for noise reduction during use of the three-two pulldown format. It is also important to know if the program was not derived from a 24 frame-per-second film source. Therefore, at this point, it is assumed that such information is made available to the receiver by the encoding of data in the vertical blanking interval.

The preceding description has demonstrated that exact reconstruction of true progressive scan video at 24 frames per second is possible. In order to avoid visible flicker, however, a higher display rate is required. The simplest and most efficient interpolation is accomplished by choosing the display rate to be a multiple of 24. In this case, each frame is repeated three times. On the other hand, if the same display is to be used for source material derived at both film and video rates, or if compatibility with existing 60 Hz progressive scan monitors is believed to be important, then interpolation to 60 video frames per second is necessary.

Previous work by the present inventor has shown that temporal interpolation by sample and hold processes, or in other words, frame repetition, are preferred to processes using temporal filters. Krause, E. A., "Motion Estimation for Frame-Rate Conversion", PhD Thesis, Massachusetts Institute of Technology, June 1987. This is true even when non-integral interpolation factors require a varying repetition rate, as is the case in three-two pulldown applications. Although low initial rates can introduce jitter effects, this artifact tends to be less annoying than the multiple image effect that occurs whenever non-adaptive temporal filters are used. Optimum interpolation would require motion-compensated interpolation filters. Unfortunately, current motion estimators are complex, expensive to implement, and prone to objectionable artifacts as estimation errors occur. For these reasons, the 3:2 pulldown method is preferred for display of the progressive scan video at 60 frames per second. FIGS. 4 and 5 illustrate how a sequential 3:2 pulldown display is achieved for interlaced transmission modes using 3:2 pulldown and pulldown with averaging respectively.

It should be clarified that there is no loss in motion rendition when compared to movies that are shown on television today. Of course, the rendition is inferior to that of 60 fields per second interlaced video acquired through the use of conventional 60 fields per second television cameras, not only because of the lower initial frame rate, but also because of the 3:2 pulldown interpolation process. Apparently, the result is still quite acceptable as evidenced by the fact that few television viewers are aware of the difference between programs derived from the two sources.

Additional features of the present invention are described in relation to the description of the preferred embodiment.

BRIEF DESCRIPTION OF THE DRAWING

FIG. 2 is timing diagram for signals derived from the film sync detection unit in the system of FIG. 1.

FIG. 3 is a state diagram for the outputs of the counter in the system of FIG. 1.

DESCRIPTION OF THE PREFERRED EMBODIMENT

Figure 1:
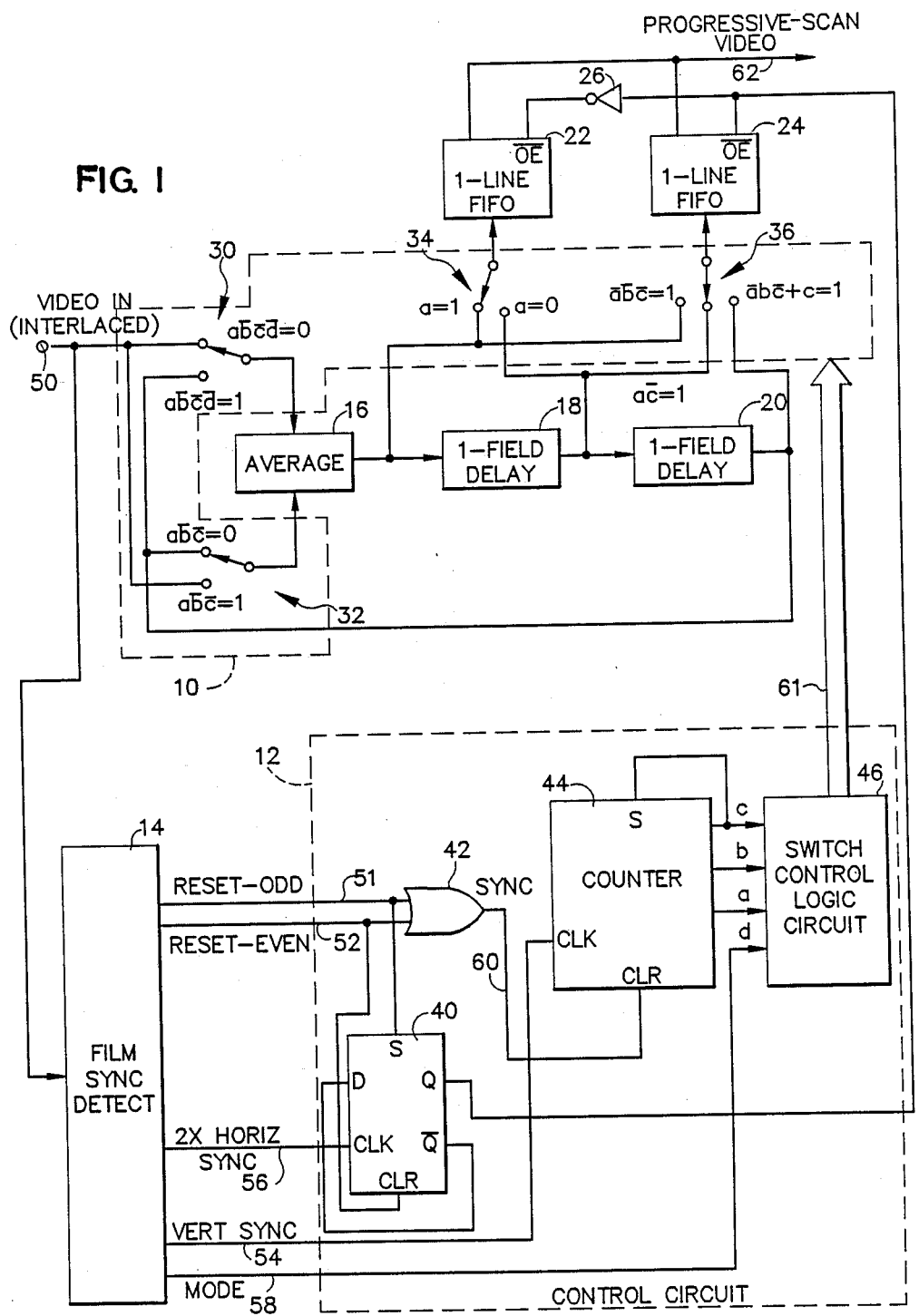
FIG. 1 is a block diagram of a preferred embodiment of the system of the present invention.

Referring to FIG. 1, a preferred embodiment of the system of the present invention includes a switching system 10, a control circuit 12, a film sync detection unit 14, an averaging device 16, a first one-field delay device 18, a second one-field delay device 20, a first one-line output FIFO stack 22 a second one-line FIFO stack 24, and an inverter 26. The switching system 10 includes a first switch 30, a second switch 32, a third switch 34 and a fourth switch 36. The control circuit 12 includes a flip-flop 40, an OR gate 42, a counter 44 and a switch control logic circuit 46.

Alternating odd and even video fields received at an input terminal 50 are provided to the film sync detection unit 14, which processes the received video fields to determine the position of the received video fields in the repetitive sequence. Such determination is accomplished in one preferred embodiment by detecting a beginning of sequence sync signal that is transmitted during the vertical blanking interval of a video signal. Such determination is accomplished in another preferred embodiment by averaging and comparing the received video fields in the manner described in a copending United States Patent Application being filed on even date herewith by Edward Anthony Krause, the present inventor, and Ron D. Katznelson for "Determination of Sequential Positions of Video Fields Derived from Film".

Upon determining the position of the received video fields in the repetitive sequence, the film sync detection unit 14 provides a reset-odd signal on line 51 and a reset-even signal on line 52. The film-sync detection unit also provides a pulsed signal on line 54 at the vertical sync rate of the video signal received at the input terminal 50 and a pulsed signal on line 56 at twice the horizontal sync rate of the video signal received at the input terminal 50. Both the VERT SYNC signal on line 54 and the 2xHORIZ SYNC signal on line 56 are derived from the video signal received at the input terminal 50. The VERT SYNC signal on line 54 is a 60 Hz signal synchronized to the beginning of each video field. The 2xHORIZ SYNC signal on line 56 is derived by doubling the 15 KHz rate of horizontal sync. This is the horizontal sync rate for the progressively scanned video output signal. The waveforms of the vertical sync signal on line 54, the reset-odd signal on line 51 and the reset even signal on line 52 for a sequence that repeats every ten video fields are shown in FIG. 2. The reset-odd signal on line 51 provides a "1" pulse at the beginning of each five-field cycle where the first field is an odd field; and the reset-even signal on line 52 provides at "1" pulse at the beginning of each five-field cycle where the first field is an even field. An odd field is distinguished from an even field by a conventional sync stripper and video timing circuit included in the film sync detection unit 14.

The film sync detection unit 14 also processes the video signal received at the input terminal 50 to determine the particular sequential mode of the video fields and, in accordance with such processing, provides a mode indication signal one line 58. The mode indication signal on line 58 is in a "1" state when the sequential mode of the video fields is that which is derived when the video fields are derived from film by the 3:2 pulldown method, is in a "0" state when the sequential mode of the video fields is that which is derived when the video fields are derived from film by the pulldown method with averaging. The film sync detection unit 14 determines the particular sequential mode of the video fields by detecting a mode indication signal provided in the vertical blanking interval of the video signal received at the video input terminal 50.

The reset-odd signal on line 51 is provided to one input of the OR gate 42 and to the set (S) input of the flip-flop 40. The reset-even signal on line 52 is provided to another input of the OR gate 42 and to the clear (CLR) input of the flip-flop 40. The 2xHORIZ SYNC signal on line 56 is provided to the clock (CLK) terminal of the flip-flop 40. The VERT SYNC signal on line 54 is provided to the clock (CLK) terminal of the counter 44. The mode indication signal on line 58 is provided to the "d" input of the switch control logic circuit 46.

The $\overline{Q}$ output terminal of the flip-flop 40 is connected to the data (D) input terminal of the flip-flop 40. The Q output terminal of the flip-flop 40 is connected to the output enable-not ($\overline{OE}$) terminal of the second one-line FIFO stack 24, and is connected via the inverter 26 to output enable-not ($\overline{OE}$) terminal of the first one-line FIFO stack 22.

The OR gate 42 provides a SYNC signal on line 60 to the clear (CLR) terminal of the counter 44.

The counter 44 has the capability of counting eight bits. It has three output terminals "a", "b" and "c". The c output terminal is connected to the set (S) terminal of the counter 44. The a, b and c output terminals of the counter 44 are connected respectively to a, b, and c input terminals of the switch control logic circuit 46. FIG. 3 is a state diagram illustrating the operation of the counter 44 in relation to the respective states of the signals at the output terminals a, b and c and the state of the SYNC signal on line 60. SYNC indicates a "1" state; and $\overline{SYNC}$ indicates a "0" state.

The switch control logic circuit 46 provides switch position control signals on lines 61 for controlling the positions of the switches 30, 32, 34 and 36. In the preferred embodiment of FIG. 1, the switch control logic circuit 46 provides switch position control signals on lines 61 to control the positions of the switches 30, 32, 34 and 36 in such a manner as to combine the odd and even video fields received at the video input terminal 50 to provide progressive-scan video frames at video output terminal 62 from the respective outputs of the first and second one-line FIFO stacks 22, 24 when the video fields are derived from film by either the 3:2 pulldown method or the pulldown method with averaging.

The respective switch positions are determined by the different combinations of the states of the signals received by the switch control logic circuit 46 at input terminals a, b and c from the counter 44 and at input terminal d from the film sync detection unit 14; and are indicated by Boolian expressions set forth in FIG. 3 adjacent the respective switch terminals that are connected when the condition set forth in such expression applies.

The switch 30 connects the video signal input terminal 50 to one input of the averaging device 16 when $\overline{abcd}=0$, and connects the output of the second one-field delay device 20 to said one input of the averaging device 16 when $\overline{abcd}=1$.

The switch 32 connects the video signal input terminal 50 to the other input of the averaging device 16 when $\overline{abc}=0$, and connects the output of the second one-field delay device 20 to said other input of the averaging device 16 when $\overline{abc}=1$.

The switch 34 connects the input terminal of the first one-line FIFO stack 22 to the output of the averaging device 16 when $a=1$ and to the output of the first one-field delay device 18 when $a=0$.

The switch 36 connects the input terminal of the second one-line FIFO stack 24 to the output of the averaging device 16 when $\overline{abc}=1$ to the output of the first one-field delay device 18 when $\overline{ac}=1$, and to the output of the second one-field delay device 20 when $\overline{abc}+c=1$.

The output terminal of the averaging device 16 is connected to the input terminal of the first one-field delay device 18; and the output terminal of the first one-field delay device 18 is connected to the input terminal of the second one-field delay device 20.

Figure 4:
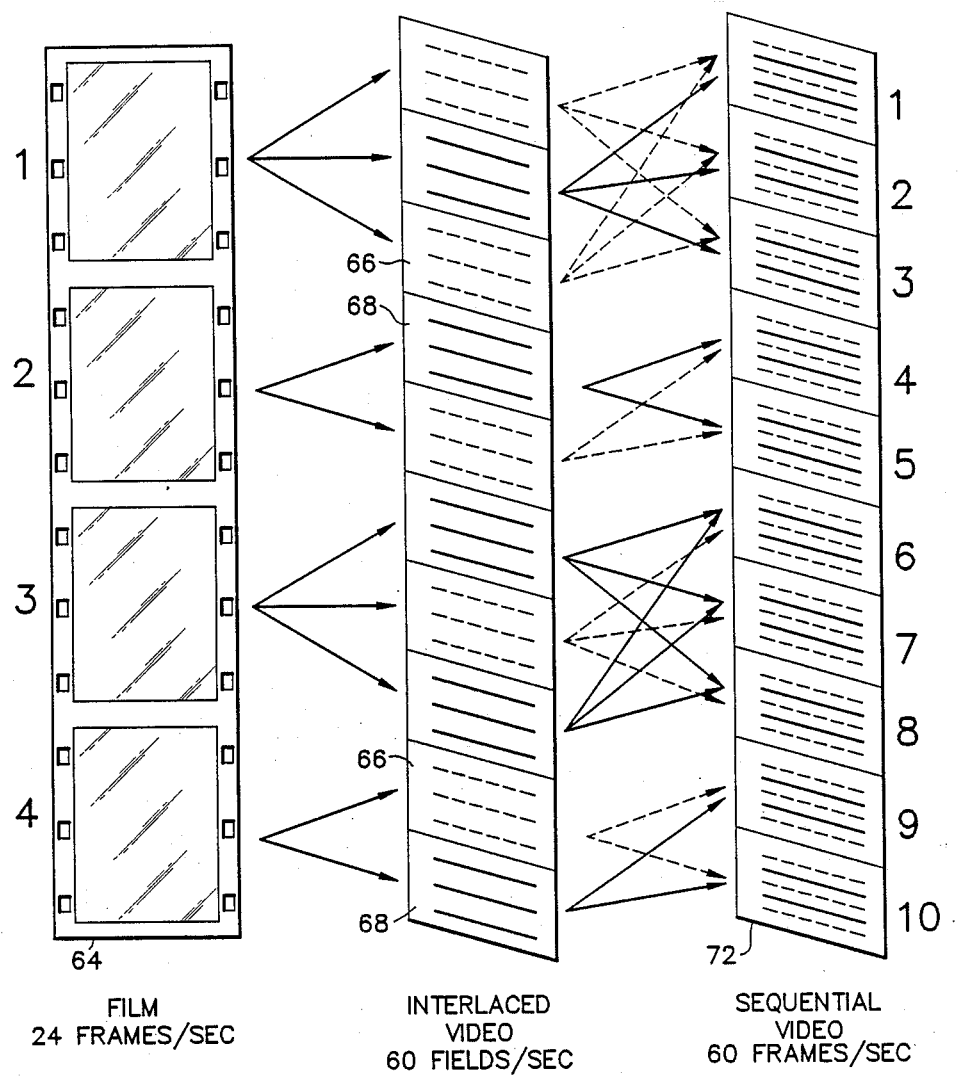
FIG. 4 is a diagram illustrating the relationship between the frames of the progressive-scan video signal, the received video fields and the film frames from which the video fields were derived from film when the video fields were derived in accordance with the 3:2 pulldown method.

FIG. 4 illustrates the relationship between the frames of the progressive-scan video signal, the received video fields and the film frames from which the video fields were derived from film when the video fields were derived in accordance with the 3:2 pulldown method. The images were recorded on the film 64 at the rate of 24 frames per second; and interlaced odd video fields 66 and even video fields 68 were derived from the film 64 at the rate of 60 fields per second.

In the repetitive sequentially varying relationship of the received video fields 66, 68 to the film frames from which they were derived in accordance with the 3:2 pulldown method, ten video fields 66, 68 are derived from every four film frames 70 with the first video field being an odd field derived from the first film frame, the second video field being an even field derived from the first film frame, the third video field being an odd field derived from the first film frame, the fourth video field being an even field derived from the second film frame, the fifth video field being an odd field derived from the second film frame, the sixth video field being an even field derived from the third film frame, the seventh video field being an odd field derived from the third film frame, the eighth video field being an even field derived from the third film frame, the ninth video field being an odd field derived from the fourth film frame, and the tenth video field being an even field derived from the fourth film frame.

When the mode signal on line 58 indicates that the received video fields were derived in accordance with the 3:2 pulldown method, the switch control logic circuit 46 provides switch position control signals on lines 61 that cause the switching system 10, the averaging device 16, the first and second one-field delay devices 18, 20, and the first and second one-line FIFO stacks 22, 24 to vary the combinations of the alternating odd and even video fields 66, 68 received at the video input terminal 50 and delayed by the first and second one-field delay devices 18, 20 in such a manner as to provide a progressive scan video frame signal at output terminal 62 by progressively interlacing the average of the first and third video fields with the second video field to provide sequentially first, second and third identical video frames, by progressively interlacing the fourth and fifth video fields with each other to provide sequentially fourth and fifth identical video frames, by progressively interlacing the average of the sixth and eighth video fields with the seventh video field to provide sequentially sixth, seventh and eighth identical video frames, and by progressively interlacing the ninth and tenth video fields with each other to provide sequentially ninth and tenth identical video frames. The progressive scan video frames 72 are provided at the output terminal 62 at the rate of 60 frames per second.

Figure 5:
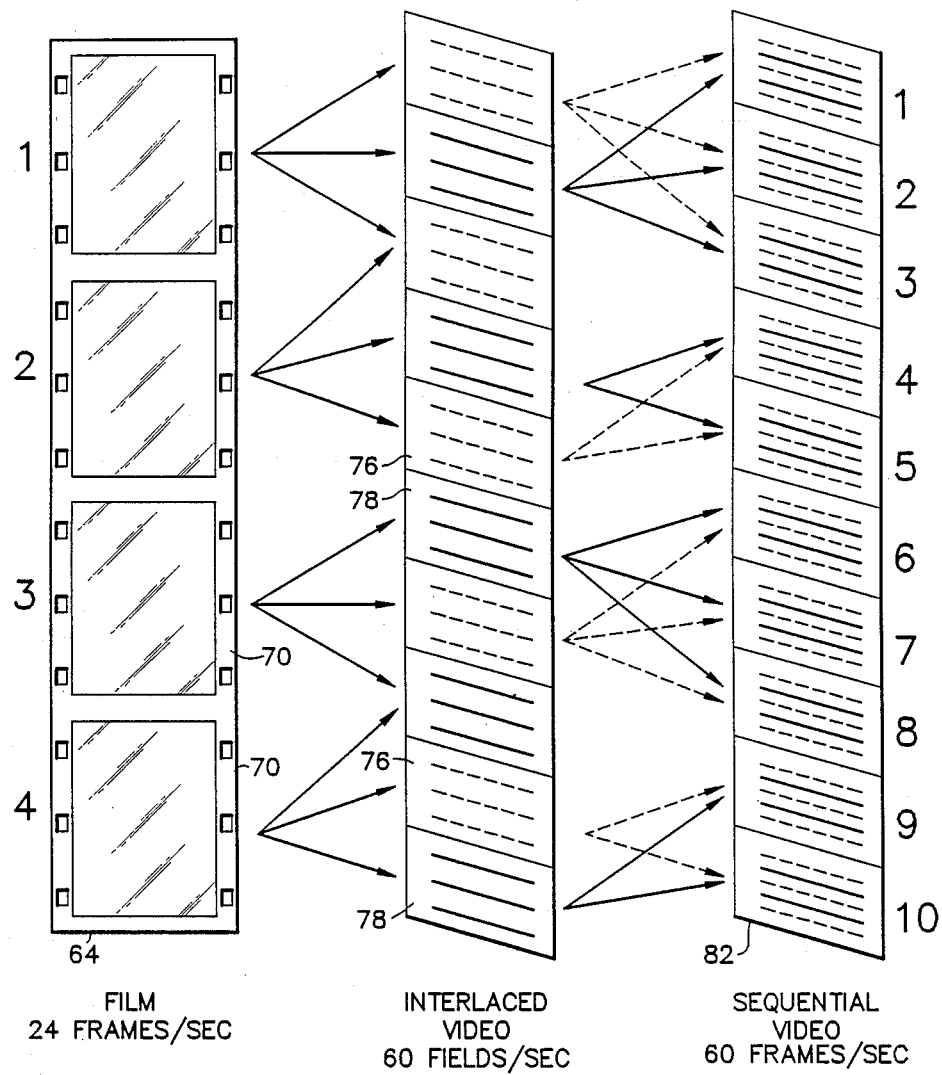
FIG. 5 is a diagram illustrating the relationship between the frames of the progressive-scan video signal, the received video fields and the film frames from which the video fields were derived from film when the video fields were derived in accordance with the pulldown method with averaging.

FIG. 5 illustrates the relationship between the frames of the progressive-scan video signal, the received video fields and the film frames from which the video fields were derived from film when the video fields were derived in accordance with the pulldown method with averaging. The images were recorded on the film 64 at the rate of 24 frames per second; and interlaced odd video fields 76 and even video fields 78 were derived from the film 64 at the rate of 60 fields per second.

In the repetitive sequentially varying relationship of the received video fields 76, 78 to the film frames 70 from which they were derived in accordance with the pulldown method with averaging, ten video fields 76, 78 are derived from every four film frames 70, with the first video field being an odd field derived from the first film frame, the second video field being an even field derived from the first film frame, the third video field being an odd field derived from an average of the first and second film frames, the fourth video field being an even field derived from the second film frame, the fifth video field being an odd field derived from the second film frame, the sixth video field being an even field derived from the third film frame, the seventh video field being an odd field derived from the third film frame, the eighth video field being an odd field derived from the fourth film frame, and the tenth video field being an even field derived from the fourth film frame.

When the mode signal on line 58 indicates that the received video fields were derived in accordance with the pulldown method with averaging, the switch control logic circuit 46 provides switch position control signals on lines 61 that cause the switching system 10, the averaging device 16, the first and second one-field delay devices 18, 20, and the first and second one-line FIFO stacks 22, 24 to vary the combinations of the alternating odd and even video fields 76, 78 received at the video input terminal 50 and delayed by the first and second one-field delay devices 18, 20 in such a manner as to provide a progressive scan video frame signal at output terminal 62 by progressively interlacing the first and second video fields with each other to provide sequentially first, second and third identical video frames, by progressively interlacing the fourth and fifth video fields with each other to provide sequentially fourth and fifth identical video frames, by progressively interlacing the sixth and seventh video fields with each other to provide sequentially sixth, seventh and eighth identical video frames, and by progressively interlacing the ninth and tenth video fields with each other to provide sequentially ninth and tenth identical video frames. The progressive scan video frames 82 are provided at the output terminal 62 at the rate of 60 frames per second.

The embodiment shown in FIG. 1 also performs intermittent field averaging to reduce noise during periods when the 3:2 pulldown scheme is known to have been used, as indicated by the mode signal on line 58. However, some modification is required if used with a composite luminance/chrominance video signal. This is because the phase of the 3.58 Mhz color subcarrier shifts by 180 degrees from frame to frame and therefore, the chrominance component would cancel out and become zero if the two frames were averaged. On the other hand, this effect could be an advantage when developing better luma/chroma separation techniques.

This progressive scan display system of the present invention can also be used when the image source was initially acquired at video rates rather than film rates. In such a case, a slight penalty in motion rendition is incurred but the result is still better than the 24 frames-per-second film rate. The transmitted signal is compatible with existing receivers and no artifacts, other than a slight loss in motion rendition, are introduced.

In one case in which the image source was initially acquired at video rates rather than film rates, already existing 60 fields-per-second interlaced sources are converted to a 30 frame-per-second progressive scan format prior to transmission to the system of the present invention by using any of the most sophisticated motion-adaptive or motion-compensated techniques. Once converted, transmission and reconstruction is trivial. Each frame is sent over two fields. The odd lines are sent as the odd field and the even lines are sent as the even field. The progressive scan system of the present invention then reconstructs each frame by combining each pair of even and odd fields. The resulting frame is then displayed twice, thereby achieving a 60 Hz display rate from a 30 frame-per-second signal. Two field storage devices are required and implementation is easily incorporated into the system of FIG. 1.

The signal that is displayed on existing receivers, when this transmission format is adopted, is the same as on new receivers including the progressive scan system of the present invention, except that is interlaced rather than progressive scan. Although slight impairments may be detected by the trained observer during motion, this is only true if compared to a signal that was initially acquired in a 60 fields-per-second interlaced format. The motion rendition is still better than what is seen in theaters or when the same movies are shown on television.

I claim:

1. A system for providing a progressive-scan video display signal from a received video signal derived from a film having successive image frames by producing odd and even video fields from each film frame, with the video fields being produced at a greater rate than the film frame rate and in a repetitive sequentially varying relationship to the film frames, the system comprising means for delaying each field of the received video signal;

means for combining the received and delayed video fields to provide a progressive-scan video frame signal at the video field rate, in which alternate lines are derived respectively from odd and even video fields;

means for determining the positions of the received video fields in the repetitive sequence; and means coupled to the determining means for controlling the combining means in accordance with said determined field positions to vary said combinations in accordance with the repetitive sequentially varying relationship of the received video fields to the film frames from which they were derived;

wherein in accordance with the repetitive sequentially varying relationship of the received video fields to the film frames from which they were derived, ten video fields are derived from every four film frames with the first video field being an odd field derived from the first film frame, the second video field being an even field derived from the first film frame, the third video field being an odd field derived from the first film frame, the fourth video field being an even field derived from the second film frame, the fifth video field being an odd field derived from the second film frame, the sixth video field being an even field derived from the third film frame, the seventh video field being an odd field derived from the third film frame, the eighth video field being an even field derived from the third film frame, the ninth video fieldl being an odd field derived from the fourth film frame, and the tenth video field being an even field derived from the fourth field frame; and wherein the controlling means cause the combining means to provide a progressive scan video frame signal by progressively interlacing the average of the first and third video fields with the second video field to provide sequentially first, second and third identical video frames, by progressively interlacing the fourth and fifth video fields with each other to provide sequentially fourth and fifth identical video frames, by progressively interlacing the average of the sixth and eighth video fields with the seventh video field to provide sequentially sixth, seventh and eighth identical video frames, and by progressively interlacing the ninth and tenth video fields with each other to provide sequentially ninth and tenth identical video frames.

2. A system for providing a progressive-scan video display signal from a received video signal derived from a film having successive image frames by producing odd and even video fields from each film frame, with the video fields being produced at a greater rate than the film frame rate and in a repetitive sequentially varying relationship to the film frames, the system comprising means for delaying each field of the received video signal;

means for combining the received and delayed video fields to provide a progressive-scan video frame signal at the video field rate, in which alternate lines are derived respectively from odd and even video fields;

means for determining the positions of the received video fields in the repetitive sequence; and means coupled to the determining means for controlling the combining means in accordance with said determined field positions to vary said combinations in accordance with the repetitive sequentially varying relationship of the received video fields to the film frames from which they were derived;

wherein in accordance with the repetitive sequentially varying relationship of the received video fields to the film frames from which they were derived, ten video fields are derived from every four film frames with the first video field being an odd field derived from the first film frame, the second video field being an even field derived from the first film frame, the third video field being an odd field derived from an average of the first and second film frames, the fourth video field being an even field derived from the second film frame, the fifth video field being an odd field derived from the second film frame, the sixth video field being an even field derived from the third film frame, the seventh video field being an odd field derived from the third film frame, the eighth video field being an even field derived from an average of the third and fourth film frames, the ninth video field being an odd field derived from the fourth film frame, and the tenth video field being an even field derived from the fourth film frame; and wherein the controlling means cause the combining means to provide a progressive scan video frame signal by progressively interlacing the first and second video fields with each other to provide sequentially first, second and third identical video frames, by progressively interlacing the fourth and fifth video fields with each other to provide sequentially fourth and fifth identical video frames, by progressively interlacing the sixth and seventh video fields with each other to provide sequentially sixth, seventh and eighth identical video frames, and by progressively interlacing the ninth and tenth video fields with each other to provide sequentially ninth and tenth identical video frames.

* * * * *